US009301050B2

(12) United States Patent
Lockwood

(10) Patent No.: US 9,301,050 B2
(45) Date of Patent: Mar. 29, 2016

(54) SQUEAL KILLER

(71) Applicant: Jason Christopher Lockwood, Louisville, KY (US)

(72) Inventor: Jason Christopher Lockwood, Louisville, KY (US)

(73) Assignee: Jason Lockwood, Louisville, KY (US)

( * ) Notice: Subject to any disclaimer, the term of this patent is extended or adjusted under 35 U.S.C. 154(b) by 269 days.

(21) Appl. No.: 14/068,619

(22) Filed: Dec. 28, 2013

(65) Prior Publication Data

US 2015/0189437 A1 Jul. 2, 2015

(51) Int. Cl.
*H04B 15/00* (2006.01)
*H04R 3/02* (2006.01)

(52) U.S. Cl.
CPC ........................................ *H04R 3/02* (2013.01)

(58) Field of Classification Search
CPC . H04R 3/02; H04R 3/002; G10L 2021/02082
USPC ........................................ 381/71.13, 93, 94.9
See application file for complete search history.

(56) References Cited

U.S. PATENT DOCUMENTS 3,322,875 A * 5/1967 Roll .......................... G10H 3/16 84/378
6,020,788 A * 2/2000 Comeau .................. H03F 3/187 330/297
2007/0035408 A1 * 2/2007 Roberts ................ G10H 1/0008 340/815.45

* cited by examiner

*Primary Examiner* — Alexander Jamal

(57) ABSTRACT

There are styles of music that rely on the amplification of a harmonica by utilizing a microphone and an amplifier. When a harmonica needs to be amplified to a level where an audience can hear, audible feedback typically occurs due to the interaction of the microphone properties with the high amplification level. This audible feedback forces the artist to maintain a lower volume level and therefore a lower projection of sound. There have been attempts to reduce feedback in the past through the use of resistor and capacitor networks, however, these attempts altered the normal sound of the amplifier which in most cases is not a positive consequence and frowned on by musicians. The Squeal Killer is the first feedback reduction device that utilizes a 12at7 vacuum tube and when used with a microphone and amplifier, significantly reduces feedback and allows the musician to obtain higher volume levels.

1 Claim, 4 Drawing Sheets

SQUEAL KILLER

INTRODUCTION

The Squeal Killer is a microphone feedback reduction device used for amplified harmonica playing.

BACKGROUND

In musical entertainment, there are styles of music that rely on the amplification of a harmonica by utilizing a microphone and an amplifier. In cases where the harmonica needs to be amplified to a level where a large audience can hear, audible feedback typically occurs due to the interaction of the microphone properties with the high amplification level. This audible feedback forces the artist to maintain a lower volume level and therefore a lower projection of sound.

There have been attempts to reduce feedback in the past through the use of resistor and capacitor networks, however, these attempts altered the normal sound of the amplifier which in most cases is not a positive consequence.

SUMMARY OF INVENTION

The Squeal Killer is a feedback reduction device that when used with a microphone and amplifier, significantly reduces feedback and allows the musician to obtain higher volume levels during performances prior to audible feedback.

BRIEF DESCRIPTION OF THE DRAWINGS

So that the manner of the above recited features of the present disclosure can be understood in detail, a more particular description of the disclosure, briefly summarized above, may be had by reference to the appended drawings. It is to be noted that the appended drawings only represent a limited number of examples and therefore are not to be considered limiting of its scope or possible configuration and use.

DETAILED SUMMARY OF INVENTION

Figure 1:
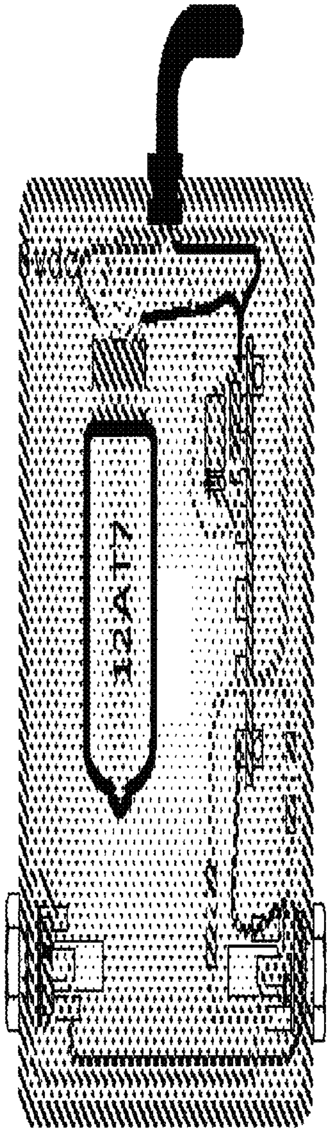
FIG. 1 illustrates an example of The Squeal Killer in a 4.67"×3.68"×1.18" Die-Cast Aluminum enclosure. In this example, the 12at7 tube is shown in its horizontal mounting configuration. Every attempt has been made to clearly illustrate scale. However, it is to be noted that the illustration is not to scale and should not limit the possible configurations.
Figure 2:
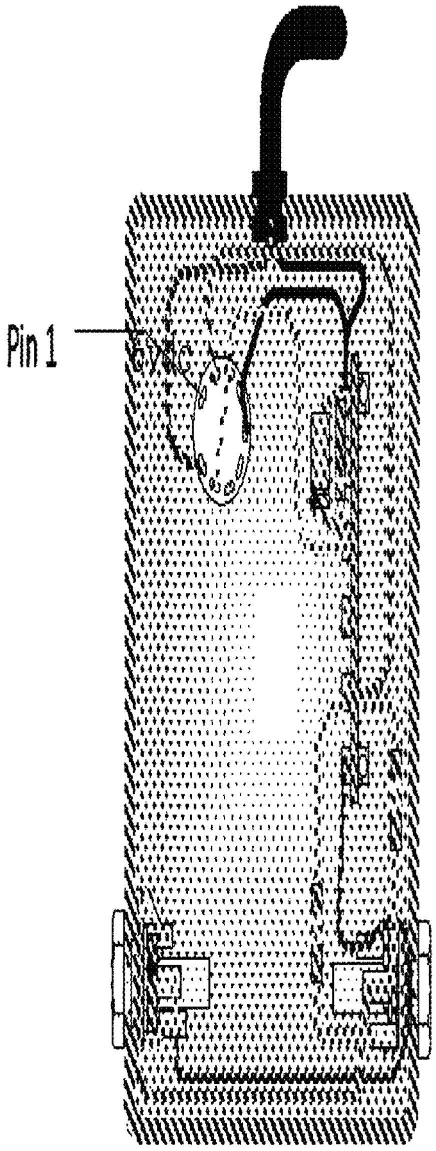
FIG. 2 illustrates an example of The Squeal Killer in a 4.67"×3.68"×1.18" Die-Cast Aluminum enclosure. In this example, the 12at7 tube is not shown in its horizontal mounting configuration. Instead, a clear view of the pin hookup for the 12at7 and in relation to the other components is shown. Every attempt has been made to clearly illustrate scale. However, it is to be noted that the illustration is not to scale and should not limit the possible configuration.
Figure 3:
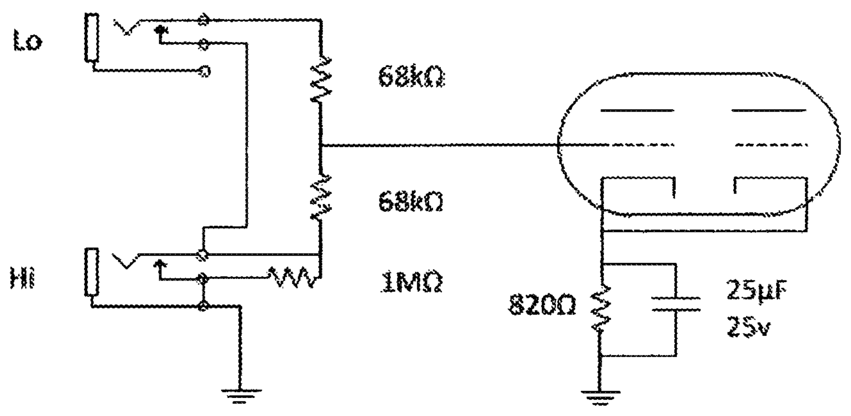
FIG. 3 illustrates The Squeal Killer in an electrical schematic format. As mentioned above, although the physical orientation of the components could be rearranged, the electrical schematic is precise and cannot be altered.
Figure 4:
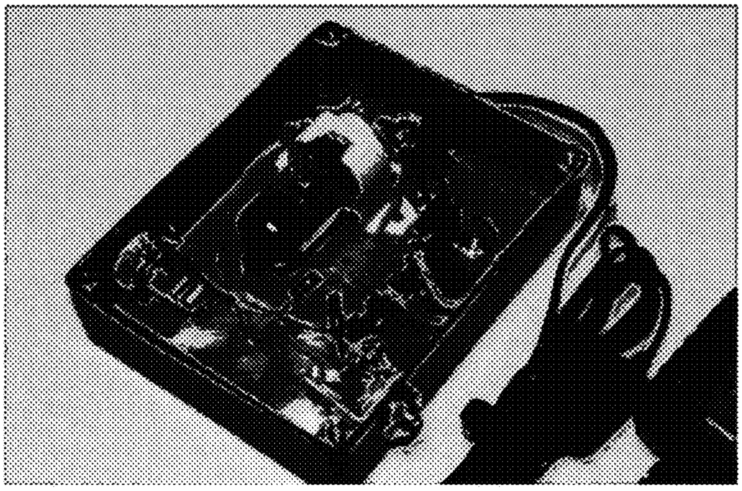
FIG. 4 illustrates an example of The Squeal Killer as a fully functioning device minus the enclosure lid. It is to be noted that The Squeal Killer does not require an enclosure to be of a certain color. As noted above, the enclosure must provide sufficient conductive properties so that the circuit can be properly grounded.
Figure 5:
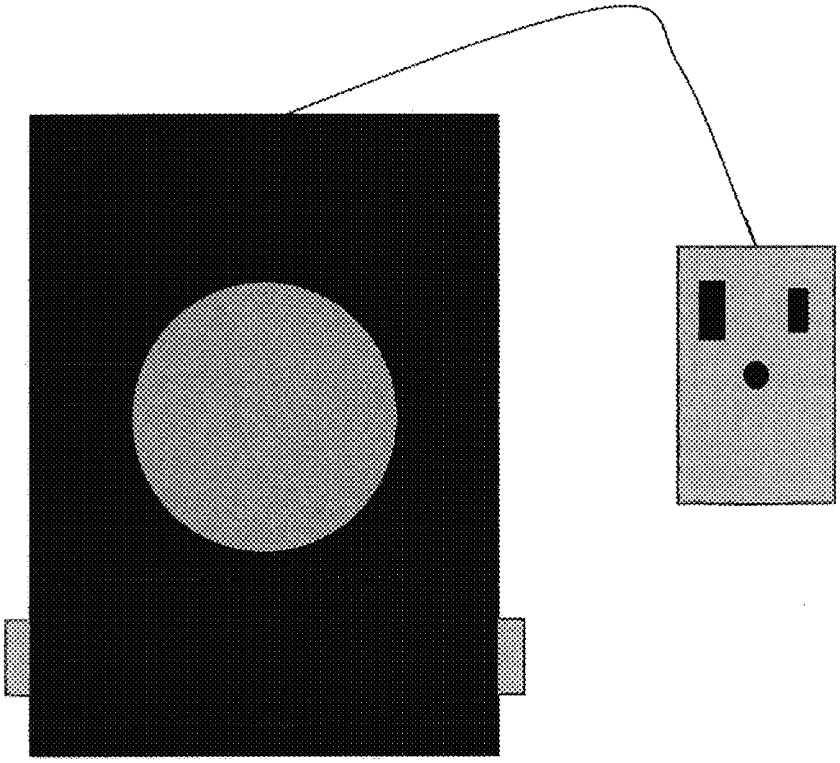
FIG. 5 illustrates an example of The Squeal Killer as a fully functioning device including the enclosure lid.

The Squeal Killer utilizes a 6 vdc power supply, one 12at7 vacuum tube, two 68 k ohm ½ watt carbon composition resistors, one 820 ohm ½ watt carbon composition resistor, one 1 meg ½ watt carbon composition resistor, one 25 uf/25 v capacitor, two Switchcraft stereo shorting input jacks, a 6 terminal mounting strip with terminal one and six grounded to the enclosure and one aluminum enclosure. It is to be noted that the enclosure must have high conductive properties and does not necessarily need to be aluminum-only that it provide a sufficient grounding property for the circuit.

Unlike products of the past, The Squeal Killer does not affect the tonal properties of the amplifier.

The output signal of the microphone is routed to the either input jack of The Squeal Killer. The input signal is then sent through a series of resistors and to the 12at7. The 12at7 tube characteristics provide an output signal attenuation and frequency reduction in both the highest and lowest bands of the audible frequency spectrum. The output signal is then sent to the amplifier utilizing the remaining jack on The Squeal Killer.

The output signal and frequency is altered in a way that reduces feedback at higher amplification and therefore volume but does not change the tonal characteristics of the harmonica or the amplifier. In other words, the full range of frequency from the instrument is amplified.

It should be noted that electrical design can be executed in several ways. However, the components of The Squeal Killer as it relates to the characteristics of the resistors, capacitor and 12at7 tube cannot be altered. That is that the schematic for The Squeal Killer is precise.

During test studies and across several different test amplifiers and harmonica microphones, The Squeal Killer was able to increase the decibels of sound prior to feedback by an average of 32%.

The invention claimed is:

1. A filtering device for a harmonica microphone using a DC power supply and configured to power a circuit comprising: one 12at7 vacuum tube coupled to one 820 ohm carbon composition resistor in parallel with one 25 uf capacitor; the vacuum tube being further coupled to the midpoint of the series connection of two 68k ohm carbon composition resistors; each of the two 68k ohm carbon composition resistors being coupled to a respective switchcraft stereo shorting input jack; a 1 meg carbon composition resistor being coupled to one of the 68k ohm carbon composition resistors and also to one of the switchcraft stereo shorting input jacks; and a terminal mounting strip coupled to a highly conductive enclosure.

* * * * *